United States Patent

Secher et al.

Patent Number: 6,019,137
Date of Patent: Feb. 1, 2000

[54] FLEXIBLE PIPE

[75] Inventors: Philippe Secher, Deville-les-Rouen; Eric Buon, Mont-Saint-Aignan, both of France

[73] Assignee: Coflexip, France

[21] Appl. No.: 08/913,546

[22] PCT Filed: Dec. 23, 1996

[86] PCT No.: PCT/FR96/02067

§ 371 Date: Aug. 25, 1997

§ 102(e) Date: Aug. 25, 1997

[87] PCT Pub. No.: WO97/25564

PCT Pub. Date: Jul. 17, 1997

[30] Foreign Application Priority Data

Jan. 11, 1996 [FR] France ................................. 96 00249

[51] Int. Cl.$^7$ .............................. F16L 55/00; B31C 5/00
[52] U.S. Cl. ........................................... 138/109; 138/104
[58] Field of Search .................................. 138/109, 156, 138/104; 264/108

[56] References Cited

U.S. PATENT DOCUMENTS

| | | | |
|---|---|---|---|
| 3,415,545 | 12/1968 | Frey et al. .................. | 285/297 |
| 4,143,892 | 3/1979 | Murphy et al. ............... | 285/149 |
| 4,275,769 | 6/1981 | Cooke ........................ | 138/109 |
| 4,366,842 | 1/1983 | Peavy et al. ................. | 138/109 |
| 4,567,916 | 2/1986 | Antal et al. ................. | 138/109 |
| 4,895,185 | 1/1990 | Champleboux et al. ......... | 138/109 |
| 5,413,147 | 5/1995 | Moreiras et al. ............. | 138/109 |
| 5,608,963 | 3/1997 | Lefere ....................... | 138/109 |

FOREIGN PATENT DOCUMENTS

| | | | |
|---|---|---|---|
| 2512165 | 9/1982 | France ................. | F16L 11/16 |
| 718830 | 2/1953 | United Kingdom . | |

Primary Examiner—Lesley D. Morris
Assistant Examiner—Davis Huy
Attorney, Agent, or Firm—Ostrolenk, Faber, Gerb & Soffen, LLP

[57] ABSTRACT

The invention relates to a flexible pipe including a hose for carrying hydrocarbons and a connection endpiece at the end of the hose. The hose has an inner carcass, a sacrificial sublayer, and a sealing barrier. The endpiece has a tubular body in which the inner carcass, the sacrificial sublayer, and the sealing barrier are inserted. A sealing bush is crimped onto the sealing barrier. The endpiece includes a retaining ring secured to the inner carcass. A lock advantageously opposes axial displacement of the retaining ring in the direction for dissembling the hose from the endpiece.

17 Claims, 4 Drawing Sheets

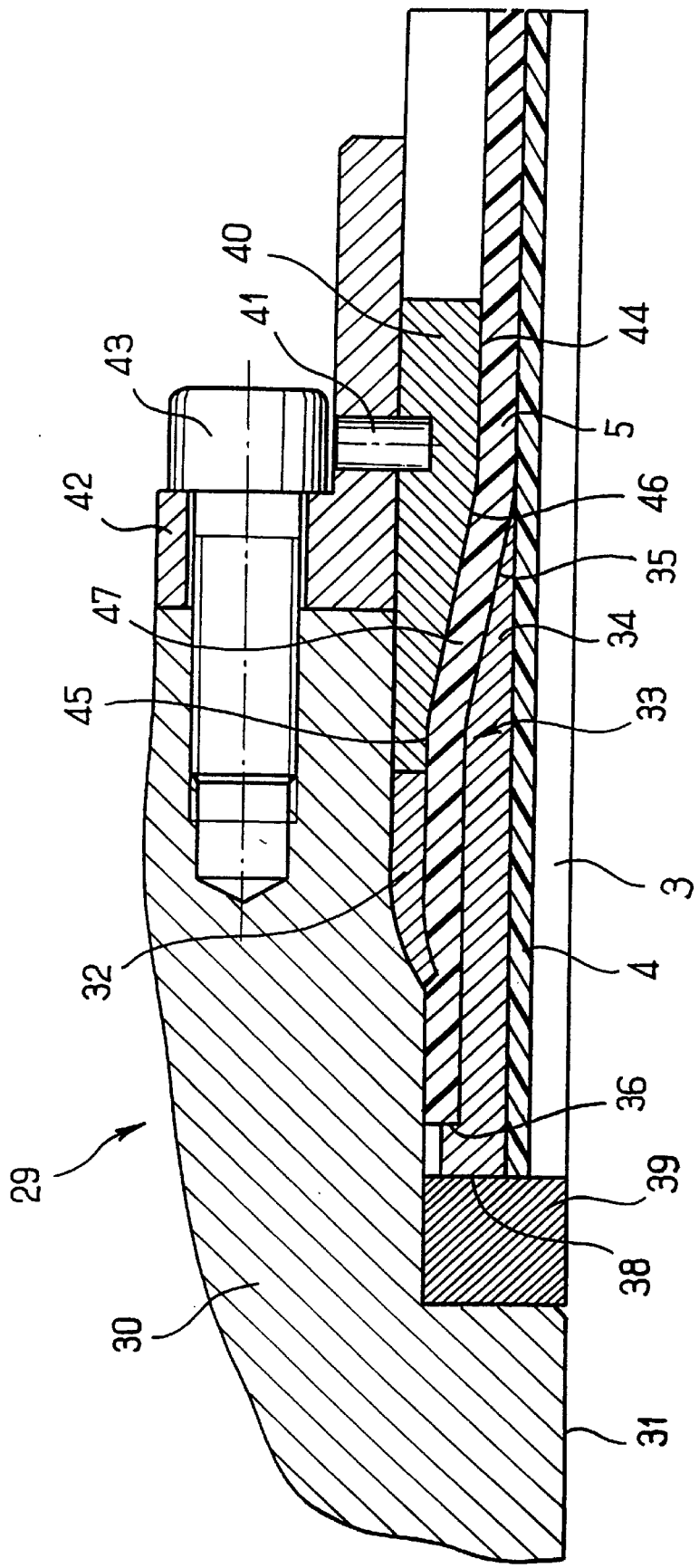
FIG._4

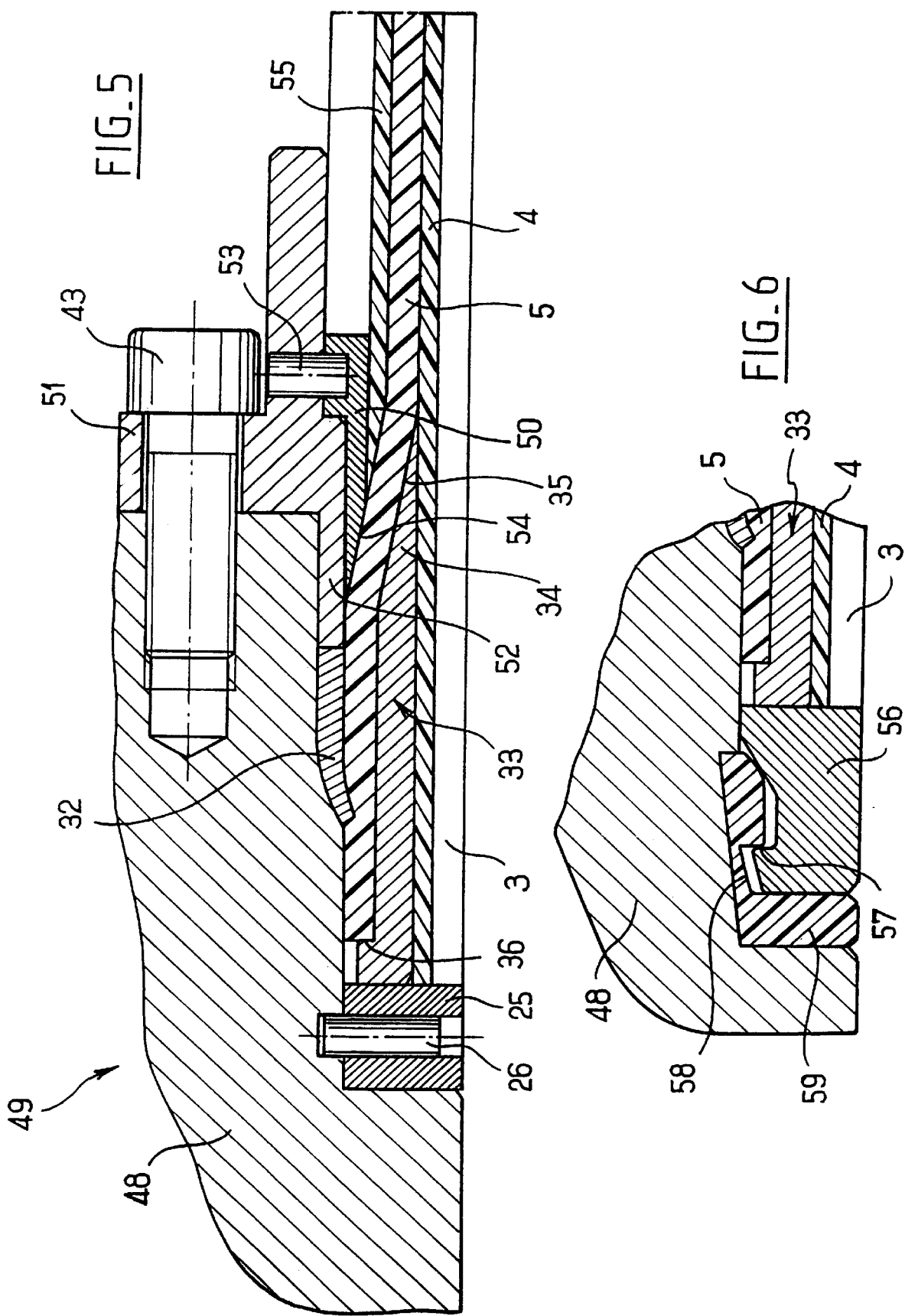
FIG._5
FIG._6

FLEXIBLE PIPE

The present invention relates to the field of flexible pipes for conveying hydrocarbons, and particularly but not exclusively to the field of flexible pipes for conveying hot hydrocarbons (typically at a temperature greater than 80° C.) such as those used for raising deposit crudes from offshore wellheads to the surface, in particular to offshore oil platforms.

BACKGROUND OF THE INVENTION

A flexible pipe is constituted by a hose or a plurality of interconnected hoses, with the or each hose being fitted at its end with connection endpieces.

In conventional manner, a hose comprises from the center towards the outside:

- armoring that resists crushing, that is not leakproof, also referred to an inner carcass, which is typically constituted by helically winding an interlocking section member, e.g. a steel strip, and provided at each end with an endpiece that is also known as a stop ring;
- a polymer layer covering the inner carcass, penetrating into the gaps therein and providing an outer surface that is substantially cylindrical and uniform, the polymer layer also being referred to as a sacrificial sublayer;
- a sealing barrier constituted by a polymer layer extruded over the sacrificial sublayer, with the purpose of the sacrificial layer being to provide the sealing barrier with a base surface that is substantially uniform;
- reinforcement for withstanding mechanical forces, in particular from internal pressure and from traction, this armoring typically comprising crossed armoring sheets of helically wound steel wires; and
- a protective outer polymer sheath.

Optionally, the hose may also include, between the sealing barrier and the armoring sheets, a polymer layer referred to as an anti-creep layer that covers said sealing barrier and that serves to prevent it creeping into the gaps of the armoring sheets.

The hose must be fixed to each connection endpiece in such a manner as to ensure both continuity of the sealing of the flexible pipe, and as to ensure that traction forces due to the bottom effect are conveyed. These forces are taken up entirely by the armoring sheets in conventional manner and as described below.

It is known to provide sealing between the endpiece and the sealing barrier by means of a sealing gasket constituted by a metal bush having a substantially conical outer surface and threaded and crimped onto the sealing barrier. The metal bush also holds the sealing barrier axially in the connection endpiece, by opposing any residual axial stresses due to the method by which the hose is manufactured. The sealing barrier is clamped between the metal bush and the inner carcass, which carcass has sufficient mechanical strength to withstand crimping of the metal bush.

Unfortunately, that known technique does not provide entire satisfaction since it has been observed in some cases that sealing is lost due to a drop in the crimping exerted by the metal bush, and the Applicant attributes this to sweating out of plasticizing agents contained in the material constituting the sealing barrier.

An increase in the crimping ratio of the bush, where crimping ratio is defined as the ratio of the penetration depth of the metal bush over the combined thickness of the sealing barrier plus the sacrificial sublayer prior to crimping, does not make it possible in satisfactory manner to obtain long-lasting sealing since an excessive crimping ratio (greater than 60%) increases the risk of the sealing barrier tearing.

OBJECTS AND SUMMARY OF THE INVENTION

An object of the invention is to remedy the above drawbacks by providing a novel assembly between a connection endpiece and a hose for conveying hydrocarbons, the hose being of the type comprising an inner carcass, a sacrificial sublayer, and a sealing barrier.

A particular object of the invention is to provide sealing in long-lasting manner between the hose and the connection endpiece.

The invention achieves this by the fact that the endpiece includes a retaining ring secured to the inner carcass, and locking means opposing axial displacement of the retaining ring in the direction for disassembling the hose from the endpiece.

The invention is based on the observation that the sweating out of plasticizing agents from the sealing barrier is not the only cause of a reduction in the clamping exerted by the metal sealing bush.

The Applicant has observed, unexpectedly, that the sacrificial sublayer tends, in known connection endpieces, to slide relative to the sealing barrier under the effect of stresses that are of thermal origin, e.g. stresses provoked by alternating temperature variations, such that once the sacrificial sublayer has moved more than a certain amount, the sealing barrier is no longer suitably clamped between the metal sealing bush and the inner carcass. The above-mentioned stresses of thermal origin can be considerable.

Because of the invention, the sacrificial sublayer which is intimately bonded to the inner carcass because the material constituting it penetrates into the gaps in the inner carcass, is itself locked axially in the endpiece and cannot move. This provides long-lasting sealing between the hose and the connection endpiece.

The inner carcass can be locked axially in various ways without going beyond the ambit of the invention.

In a first embodiment, the retaining ring is provided with an outwardly open housing and the retaining ring is locked axially relative to the body of the endpiece by a member secured to the body of the endpiece and inserted into the housing.

In a second embodiment, advantageously combined with the first, the inner carcass is locked axially by means of a nipple having one end inserted between the sacrificial sublayer and the sealing barrier, and coming into axial abutment at its other end against the retaining ring. The nipple causes the sealing barrier to expand radially and it is held axially in the body of the endpiece by means of a backing piece secured to the body of the endpiece and defining, relative to the expanded end of the sealing barrier, a narrowing of section, also referred to as a "dog leg", which opposes axial withdrawal of the portion of the sealing barrier engaged on the nipple.

Advantageously, the length of the nipple is selected to be such that the sealing barrier is compressed between the nipple and the backing piece, and the relative axial positioning of the nipple and of the backing piece is preferably selected in such a manner as to obtain a compression ratio of the sealing barrier lying in the range 5% to 20%.

Advantageously, the end of the nipple situated adjacent to the backing piece is radially defined on the outside by a conical surface whose angle at the apex preferably lies in the range 3° to 30°.

Advantageously, the crimping ratio of the metal sealing bush on the sealing barrier lies in the range 5% to 60%, and preferably in the range 10% to 40%.

The invention also provides an endpiece for fitting to a flexible pipe as defined above.

BRIEF DESCRIPTION OF THE DRAWINGS

Other characteristics and advantages of the present invention appear on reading the following description of non-limiting embodiments of the invention, and on examining the accompanying drawings, in which:

FIG. 4 is a fragmentary diagrammatic axial section view of one end of a flexible pipe forming a second embodiment of the invention;

FIG. 5 is a fragmentary diagrammatic axial section view of one end of a flexible pipe forming a third embodiment of the invention; and FIG. 6 shows a variant of the embodiment shown in FIG. 5.

DETAILED DESCRIPTION

Figure 1:
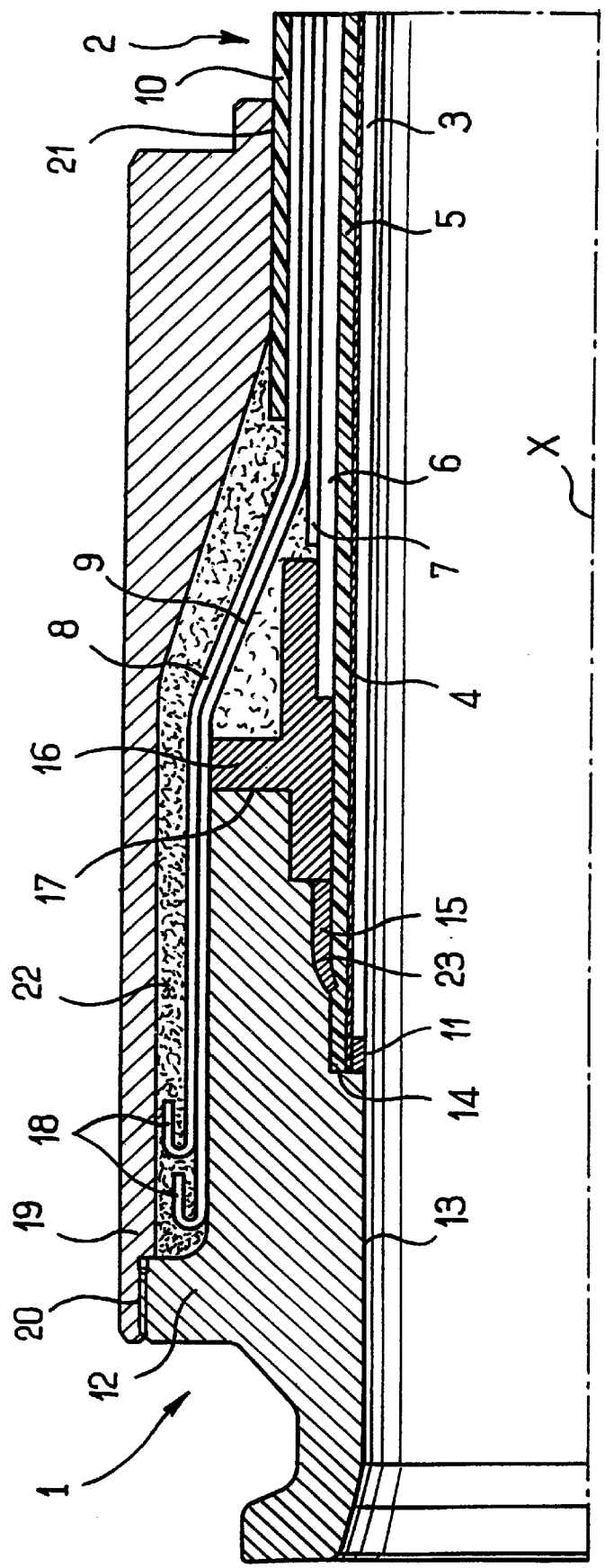
FIG. 1 is a diagrammatic fragmentary axial section through one end of a "rough bore" type flexible pipe of the prior art.

FIG. 1 shows one end of a state-of-the-art flexible pipe having a connection endpiece 1 implemented in conventional manner at the end of a hose 2.

Throughout the description below, terms such as "front" and "rear" are used with reference to zones situated respectively adjacent to the endpiece 1 and adjacent to the hose 2.

The hose 2 is of known type, and it is manufactured and sold in great lengths by the assignee of the present invention.

Going outwards from the center, the hose comprises in succession: an inner carcass 3; a sacrificial sublayer 4; a sealing barrier 5; armoring 6 that resists the circumferential component of internal pressure; an anti-friction layer 7; armoring against traction, constituted by crossed sheets 8 and 9; and an outer protective layer 10.

The inner carcass 3 is typically constituted by an interlocking strip. It is provided at its end with a stop ring 11.

The sacrificial sublayer 4 is extruded over the inner carcass so that the material from which it is made penetrates into the interstices of the interlocking strip constituting the carcass. The sacrificial sublayer 4 is advantageously made in conventional manner out of a PVDF polymer capable of withstanding temperatures greater than 100° C.

The sacrificial sublayer 4 also has an outer surface that is substantially smooth and circularly cylindrical about the longitudinal axis of the hose, and on which the sealing barrier 5 is extruded without being intimately bonded to the inner carcass 3, and thus without running the risk of being damaged in operation thereby. The sealing barrier 5 is advantageously made in conventional manner out of a PVDF polymer capable of withstanding temperatures greater than 100° C.

The armoring 6 is made in conventional manner by winding one or more layers of interlocking metal tapes.

The armoring sheets 8 and 9 are typically wound in conventional manner at winding angles lying in the range 30° to 55°, as a function of the internal pressure it is to withstand.

The connection endpiece 1 comprises a metal body 12 also known as a "vault" defining a central passage 13 that is circularly cylindrical about a longitudinal axis X. The central passage 13 has a shoulder 14 that serves as a stop for the stop ring 11 of the inner carcass 3, and for the sealing barrier 5.

Sealing between the sealing barrier 5 and the body 12 of the endpiece is obtained by means of a metal sealing bush 15 crimped on the sealing barrier and held axially in the endpiece by means of a ring 16 which engages in the rear end 17 of the endpiece body 12, leaving an annular gap around the sealing barrier 5 in which the armoring 6 is received.

The armoring sheets 8 and 9 pass over the outside of the body 12 and at their front ends 18 they both have folded-back hook-forming portions angularly distributed around the longitudinal axis X and improving fixing to the body 12 of the endpiece, as specified below.

A tubular cap 19 fitted onto the body 12 is connected thereto at its front end 20, and its other end has a passage 21 through which the hose 2 passes.

The cap 19 co-operates with the body 12 to define an annular volume 22 inside the connection endpiece 1 and in which the front ends of the sheets 8 and 9 extend. This annular volume 22 is filled with a thermosetting polymer resin enabling the sheets 8 and 9 to be secured to the body 12 so as to ensure that axial traction forces are transmitted between the hose 2 and the connection endpiece 1.

In the known flexible pipe as shown in FIG. 1, sealing between the sealing barrier 5 and the body 12 is obtained by means of the bush 15 whose inside surface crushes the sealing barrier 5. The sealing barrier is thus clamped between the bush 15 and the inner carcass 3.

The bush 15 can naturally have various different shapes, the important point is to obtain continuous sealing with the body of the endpiece. In the example described, the bush 15 co-operates with a conically-shaped annular housing 23 that converges forwards, so as to be deformed on coming into contact with the endpiece body when it is pushed axially forward into the body 12, thus causing it to press into the sealing barrier 5.

Figure 2:
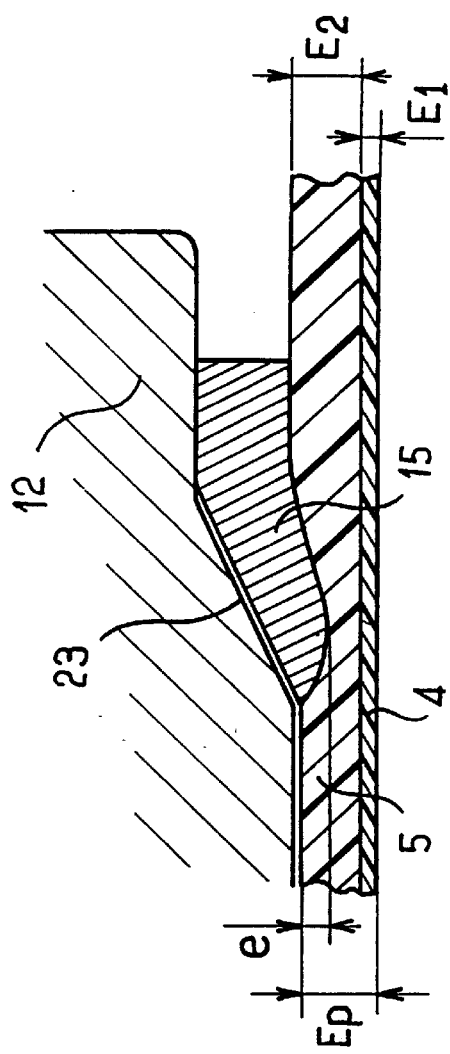
FIG. 2 is a view for illustrating the notion of crimping ratio.

The crimping ratio of the bush 15 is described as being the ratio $e/E_p$ where e designates the penetration depth of the bush 15, and $E_p$ designates the total thickness of the sacrificial sublayer 4 plus the sealing barrier 5, such that $E_p=E_1+E_2$ in the example of FIG. 2 where $E_1$ designates the thickness of the sacrificial sublayer 4 and $E_2$ designates the thickness of the sealing barrier 5.

Figure 3:
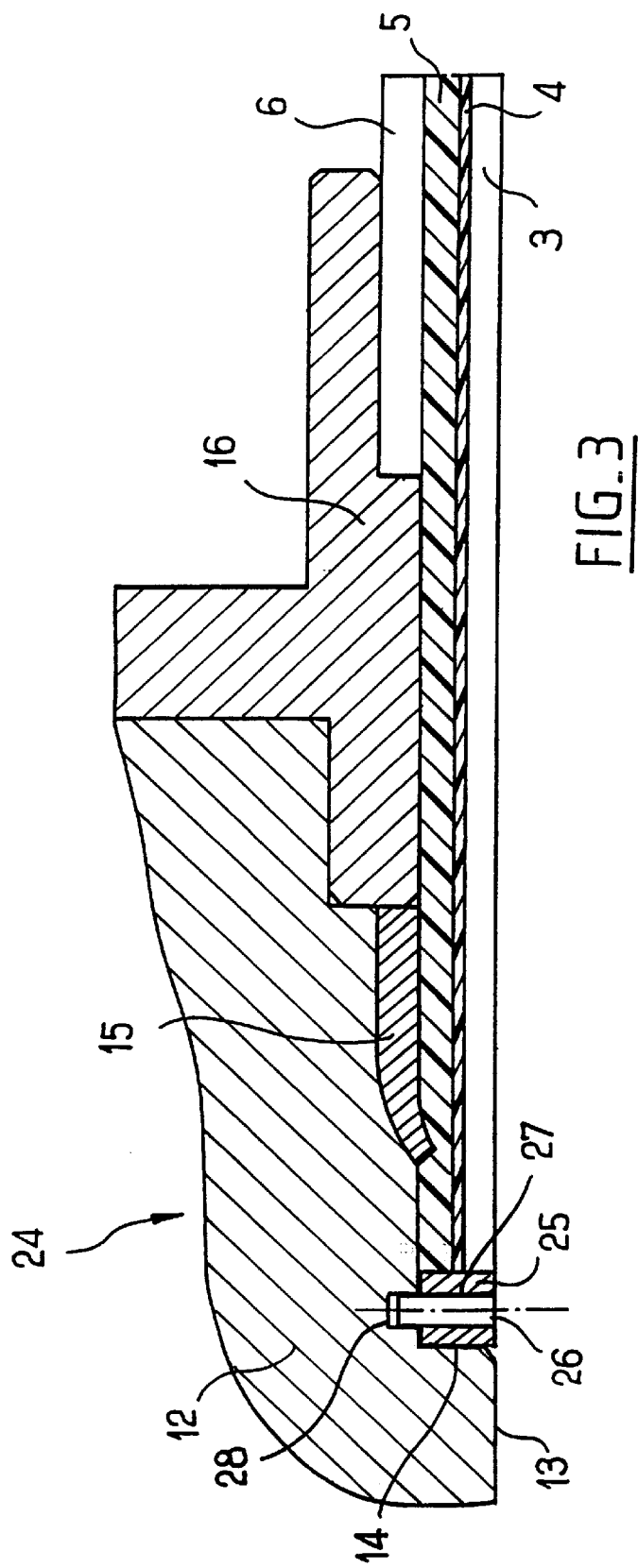
FIG. 3 is a fragmentary diagrammatic axial section view of one end of a flexible pipe constituting a first embodiment of the invention.

FIG. 3 shows the end of a flexible pipe constituting a first embodiment of the invention. This pipe has a connection endpiece 24 at the end of a hose which, for the purpose of clarifying the drawing, is represented solely by its inner carcass 3, sacrificial sublayer 4, sealing barrier 5, and armoring 6. The inner carcass 3 is provided at its end with a retaining ring 25 that projects radially outwards from the outer surface of the inner carcass 3. The retaining ring 25 can be fixed directly on the interlocking strip of the inner carcass 3, in which case it also serves as a stop ring, or in a variant it may be fitted to an underlying stop ring fixed in conventional manner to the front end of the inner carcass 3.

In a first embodiment of the invention, the retaining ring 25 of the inner carcass 3 is received in the body 12 of the endpiece until its front edge comes into abutment against the shoulder 14, and it is locked axially inside the body 12 of the connection endpiece 24 by means of pins 26 that are angularly distributed around the longitudinal axis of the endpiece, each having one end inserted in a radial hole 27 drilled in the retaining ring 25 and having its other end received in a hole 28 drilled in the body 12. Apart from the axial locking of the inner carcass 3 in the body 12, the connection endpiece 24 is otherwise identical to that described with reference to FIG. 1, and consequently it is not shown in full.

FIG. 4 shows a connection endpiece 29 constituting a second embodiment of the invention.

The endpiece 29 comprises a metal body 30 defining a central passage 31 for fluids, which passage is circularly cylindrical about the longitudinal axis of the endpiece.

FIG. 4 shows only the radially innermost portion of the body 30 of the endpiece, in which there are inserted: the inner carcass 3; the sacrificial sublayer 4; and the sealing barrier 5; the remainder of the endpiece body 30 being known per se.

A metal sealing bush 32 identical to the above-described bush 15 is locked axially in the body 30 as described below and it locally crushes the sealing barrier 5 to obtain sealing between the hose and the endpiece, in the manner described with reference to FIG. 1.

A tubular insert 33, referred to herein as a "nipple" is engaged between the sacrificial sublayer 4 and the sealing barrier 5.

In the embodiment shown in FIG. 4, the nipple 33 has a tubular cylindrical mid-portion. It has an inner surface that is uniformly circularly cylindrical over its entire length, and a chamfered tapering rear end 34 defined on the outside by a conical surface 35 having an angle at the apex lying in the range 3° to 30°. At its front end, the nipple 33 has a shoulder to define a stop 36 for the sealing barrier 5.

The radius of the inner surface of the nipple 33 is suitable for mounting on the sacrificial sublayer 4 covering the inner carcass 3.

The front end edge of the nipple 33 comes axially into abutment against the rear face 38 of a retaining ring 39 secured to the front end of the inner carcass.

The endpiece includes a backing piece 40 which is held axially in the body 30 by means of pins 41 angularly distributed about the longitudinal axis of the endpiece. Each pin 41 engages firstly in an annular retaining piece 42 secured by bolts 43 to the rear of the endpiece body 30, and secondly in the backing piece 40.

The shape of the backing piece 40 is complementary to the end portion 34 of the nipple 33. More precisely, as shown in FIG. 4, the backing piece 40 is defined on its radially inner face in contact with the sealing barrier 5 by two surfaces 44 and 45 that are circularly cylindrical about the longitudinal axis of the endpiece and that are united by a surface 46 parallel to the conical surface 35 of the nipple 33. In the example described, the difference between the diameters of the surfaces 44 and 45 corresponds to twice the thickness of the middle portion of the nipple 33. The front end of the backing piece 40 locks the sealing bush 32 axially in position.

In the embodiment shown in FIG. 4, the length of the nipple is determined to conserve a radial distance between its chamfered outer surface 35 and the facing inner surface 46 of the backing piece 40, which radial distance is equal to the thickness of the sealing barrier.

Inserting the nipple between the sacrificial sublayer 4 and the sealing barrier 5 causes the sealing barrier 5 to expand radially and to be deflected radially outwards over its portion 47 extending in contact with the conical surfaces 35 and 46 so as to form a bend known as a "dog leg".

The backing piece 40 defines a narrowing relative to the expanded portion of the front end of the sealing barrier 5 that opposes withdrawal of the nipple 33 and locks it axially inside the body 30 of the endpiece, thereby preventing any axial rearwards displacement of the retaining ring 39, and thus any sliding of the sacrificial sublayer 4 which is intimately bonded to the inner carcass 3. In addition, the conical surface 46 exerts clamping on the sealing barrier 5 which increases with increasing traction force tending to drag the sealing barrier 5 together with the nipple 33 rearwards away from the body of the endpiece, and this effectively prevents any axial displacement of the sacrificial sublayer 4 relative to the sealing bush 32, thus guaranteeing that sealing is maintained durably between the hose and the endpiece.

In addition, because the sealing barrier 5 is locked axially between the nipple 33 and the backing piece 40, it is possible to make do with a moderate crimping ratio for the bush 32, typically lying in the range 5% to 60% and advantageously in the range 10% to 40%, depending on the nature of the material constituting the sealing barrier 5 and thus avoiding the risk of nicking through the barrier in the long term.

Clamping of the sealing barrier between the nipple 33 and the sealing bush 32 also makes it possible to avoid being constrained by the crushing strength of the end of the inner carcass 3.

Advantageously, the two methods of locking the inner carcass 3 as described above with reference to FIGS. 3 and 4 are used in combination.

Thus, FIG. 5 shows a variant embodiment in which the inner carcass 3 is locked axially in the body 48 of the endpiece 49 by means of pins 26 as in the embodiment described with reference to FIG. 3, and in which the sealing barrier 5 is clamped between the rear end of the nipple and a backing piece 50. In the embodiment of FIG. 5, the bush 32 is retained axially in the body 48 by means of an annular part 51 held by pins 53 to the rear of the body of the endpiece and also serving to hold the backing piece 50.

At its front end, the retaining piece 51 has a tubular portion 52 which engages in an annular gap formed between the body 48 and the sealing barrier 5, and which extends to the bush 32.

The backing piece 50 fits against the radially inner surface of the retaining part 51. More precisely, the backing piece 50 is locked axially in the endpiece 49 by means of pins 53 that are angularly distributed around the longitudinal axis of the endpiece and each engaging at one end in a hole drilled in the backing piece 50, and at its other end in a hole drilled in the bolt 43.

The backing piece 50 has a circularly cylindrical radially inner surface that is extended forward by a conical surface 54 which faces the conical surface 35 and extends parallel thereto.

In the example described, the sealing barrier 5 is covered by an anti-creep layer 55 which comes to an end before the front end of the sealing barrier 5.

The anti-creep layer 55 is locked in the body of the endpiece by means that are known per se and not shown in the figure in order to clarify the drawing.

FIG. 6 shows a variant embodiment of the fastening between the retaining ring secured to the inner carcass 3 and the body 48 of the endpiece. In this embodiment, the retaining ring, referenced 56, is locked axially in the body of the endpiece, not by means of pins as described with reference to FIG. 5, but by complementary shapes between a rim 57 projecting outwards from the radially outer surface of the retaining ring 56 and an annular groove 58 formed in the radially inner face of a ring 59 secured to the body 48 of the endpiece.

The ring 59 is fixed to the body 48 of the endpiece by any appropriate means known to the person skilled in the art, and the rim 57 snaps into the annular groove 58 when the hose is inserted into the endpiece.

In the embodiments described above, the sealing barrier 5 is advantageously compressed between the rear end of the nipple 33 and the backing piece 40 (embodiment of FIG. 4) or the backing piece 50 (embodiment of FIG. 5) so as to further improve axial locking of the nipple 33. The length of the nipple 33 is preferably selected to obtain the desired relative axial positioning between the nipple and the backing piece 40 or 50 to ensure that the compression ratio of the sealing barrier 5 obtained when the hose is assembled to the endpiece lies in the range 5% to 20%, with this compression ratio being defined as the ratio of the thickness of the compressed sealing barrier to its thickness in the absence of compression.

Naturally, the invention is not limited to the embodiments described above.

In order to clarify the drawings, they do not show conventional means (e.g. radial holes) enabling the various pins to be installed in order to lock the retaining ring to the inner carcass. The means used for installing such pins preferably also allow them to be removed so as to make it possible to disassemble the connection endpiece.

Also, without going beyond the ambit of the invention, it is possible to modify the shape of the nipple and that of the backing piece which is shaped to co-operate with the nipple, and to achieve axial locking of the inner carcass 3 inside the body of the endpiece by any other appropriate fixing means known to the person skilled in the art.

We claim:

1. A flexible pipe comprising:
    a hose for carrying hydrocarbons, the hose comprising an inner carcass, a sacrificial sublayer, and a sealing barrier, the hose having an end;
    a connection endpiece disposed on the end of the hose, the endpiece having a tubular body in which the inner carcass, the sacrificial sublayer, and the sealing barrier are inserted,
    a sealing bush crimped onto the sealing barrier,
    a retaining ring secured to the inner carcass, and
    a lock for securing the retaining ring within the tubular body and preventing axial displacement of the retaining ring relative to the tubular body in the direction for disassembling the hose from the endpiece.

2. A pipe according to claim 1, wherein the lock includes a nipple for inserting via one end between said sacrificial sublayer and the sealing barrier, and a backing piece secured to the endpiece and designed to have the sealing barrier pass therethrough, co-operating with the portion of the sealing barrier engaged on the nipple to define a narrowing of section that opposes axial withdrawal of the portion of the sealing barrier.

3. A pipe according to claim 2, wherein the backing piece is shaped to oppose axial withdrawal of the nipple, and wherein the nipple has an end remote from the backing piece designed to come into abutment against the retaining ring to lock the retaining ring axially in the endpiece.

4. A pipe according to claim 2, wherein the relative position of the backing piece and of the nipple in the endpiece is selected so that the sealing barrier is compressed with a compression ratio lying in the range 5% to 20%.

5. A pipe according to claim 2, wherein the nipple has an end situated adjacent to the hose that is defined radially on the outside by a conical surface the conical surface having an angle at the apex in the range of 3° to 30°.

6. A pipe according to claim 1, wherein the retaining ring is provided with an outwardly open housing and wherein the said locking means include a member secured to the body of the endpiece and suitable for being inserted in said housing to retain said retaining ring axially.

7. A pipe according to claim 1, wherein the crimping ratio of the sealing bush on the sealing layer lies in the range of 5% to 60%.

8. A connection endpiece for fitting to a pipe as defined in claim 1.

9. A pipe according to claim 7, wherein the crimping ratio of the sealing bush on the sealing layer lies in the range of 10% to 40%.

10. A flexible pipe according to claim 1, wherein the sacrificial sublayer is bonded to the inner carcass.

11. A flexible pipe according to claim 1, wherein the sealing bush clamps the sealing barrier between the sealing bush and the inner carcass.

12. A flexible pipe according to claim 1, wherein the retaining ring is fixed to an end face of the inner carcass.

13. A flexible pipe comprising:
    a hose for carrying hydrocarbons, the hose comprising an inner carcass, a sacrificial sublayer, and a sealing barrier;
    the hose having a distal end, a connection endpiece at the distal end of the hose, the connection endpiece having a tubular body in which are inserted portions of each of the inner carcass, the sacrificial sublayer, and the sealing barrier of the hose,
    a retaining ring secured to the inner carcass,
    sealing bush crimped onto the sealing barrier, the sealing barrier being clamped between the sealing bush and the inner carcass;
    a ring disposed proximally to the sealing bush and holding the sealing bush axially in the connection endpiece; and
    a lock for opposing distal axial displacement of the retaining ring.

14. A pipe according to claim 13, wherein the lock comprises a nipple disposed between the sealing barrier and the sacrificial sublayer.

15. A pipe according to claim 14 wherein the lock further comprises a member secured between the retaining ring and the body.

16. A pipe according to claim 13 wherein the lock further comprises a member secured between the retaining ring and the body.

17. A pipe according to claim 16, wherein the lock comprises a nipple disposed between the sealing barrier and the sacrificial sublayer.

* * * * *